(12) United States Patent
Sugiyama et al.

(10) Patent No.: US 8,810,061 B2
(45) Date of Patent: Aug. 19, 2014

(54) VEHICULAR POWER SUPPLY APPARATUS, VEHICLE INCLUDING THE SAME, AND METHOD FOR CONTROLLING VEHICLE-MOUNTED CHARGER

(75) Inventors: Yoshinobu Sugiyama, Toyota (JP); Yosei Sakamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/876,262

(22) PCT Filed: Oct. 14, 2010

(86) PCT No.: PCT/JP2010/068065
§ 371 (c)(1),
(2), (4) Date: Mar. 27, 2013

(87) PCT Pub. No.: WO2012/049755
PCT Pub. Date: Apr. 19, 2012

(65) Prior Publication Data
US 2013/0193751 A1 Aug. 1, 2013

(51) Int. Cl.
*B60L 1/00* (2006.01)
(52) U.S. Cl.
USPC .......................................... 307/9.1; 307/10.1
(58) Field of Classification Search
USPC .................................. 307/9.1, 10.1
See application file for complete search history.

(56) References Cited

U.S. PATENT DOCUMENTS

| 5,994,789 | A | 11/1999 | Ochiai |
| 2010/0019723 | A1 | 1/2010 | Ichikawa |
| 2011/0187184 | A1 | 8/2011 | Ichikawa |

FOREIGN PATENT DOCUMENTS

| CN | 101610932 A | 12/2009 |
| CN | 101624021 A | 1/2010 |
| JP | 5-11701 U | 2/1993 |
| JP | A-09-009417 | 1/1997 |
| JP | A-10-164709 | 6/1998 |
| JP | A-10-224902 | 8/1998 |
| JP | A-10-248263 | 9/1998 |
| JP | A-2008-289305 | 11/2008 |
| JP | A-2009-225587 | 10/2009 |
| JP | A-2009-232644 | 10/2009 |
| JP | A-2011-229275 | 11/2011 |

*Primary Examiner* — Hal Kaplan
(74) *Attorney, Agent, or Firm* — Oliff PLC

(57) ABSTRACT

A charger is configured to receive electric power from an external power supply and charge a main power storage device and a power storage device for auxiliary machinery. The charger includes a capacitor for smoothing charging power outputted to the main power storage device. A PM-ECU controls charging of the power storage device for auxiliary machinery by the charger such that the power storage device for auxiliary machinery can receive residual electric charge in the capacitor. The PM-ECU controls the charger, after the end of charging of the main power storage device by the charger, such that the residual electric charge in the capacitor is discharged into the power storage device for auxiliary machinery.

10 Claims, 9 Drawing Sheets

VEHICULAR POWER SUPPLY APPARATUS, VEHICLE INCLUDING THE SAME, AND METHOD FOR CONTROLLING VEHICLE-MOUNTED CHARGER

TECHNICAL FIELD

The present invention relates to a vehicular power supply apparatus, a vehicle including the same, and a method for controlling a vehicle-mounted charger. Particularly, the present invention relates to a vehicular power supply apparatus in which a vehicle-mounted power storage device can be charged by a power supply external to a vehicle, a vehicle including the vehicular power supply apparatus, and a method for controlling a vehicle-mounted charger.

BACKGROUND ART

Japanese Patent Laying-Open No. 10-224902 (PTL 1) discloses a motor driving control apparatus for an electric vehicle. In this motor driving control apparatus, after a key switch is turned off, a load switch by which all loads of a battery are turned on/off is opened, and at the same time, auxiliary circuits are started. Thus, residual electric charge in a DC link capacitor is discharged by the auxiliary circuits.

Therefore, without providing a discharge resistor, the residual electric charge in the DC link capacitor can be immediately discharged after the key switch is turned off. As a result, useless power consumption in the main battery is avoided and maintenance can be immediately started after the key switch is turned off (refer to PTL 1).

CITATION LIST

Patent Literature

PTL 1: Japanese Patent Laying-Open No. 10-224902
PTL 2: Japanese Patent Laying-Open No. 10-164709
PTL 3: Japanese Patent Laying-Open No. 2009-225587

SUMMARY OF INVENTION

Technical Problem

In an electric vehicle and a plug-in hybrid vehicle in which a vehicle-mounted power storage device can be charged by a power supply external to the vehicle (hereinafter also referred to simply as "external power supply"), a charger for charging the vehicle-mounted power storage device by the external power supply is mounted on the vehicle. The charger is generally provided with a capacitor for smoothing the charging power outputted to the power storage device.

After charging of the power storage device by the external power supply ends, residual electric charge in the capacitor must be discharged immediately. As a method for discharging the residual electric charge in the capacitor, providing a discharge resistance is known. However, it leads to an increase in cost. Therefore, it is desirable to immediately discharge the residual electric charge in the capacitor of the charger without using the discharge resistance. This is not, however, particularly discussed in Japanese Patent Laying-Open No. 10-224902 described above.

The present invention has been made to solve the above problem, and an object of the present invention is to provide a vehicular power supply apparatus in which the residual electric charge in the capacitor provided in the charger can be reliably discharged without using the discharge resistance, and a vehicle including the vehicular power supply apparatus.

Another object of the present invention is to provide a method for controlling a vehicle-mounted charger, in which the residual electric charge in the capacitor provided in the charger can be reliably discharged without using the discharge resistance.

Solution to Problem

According to the present invention, a vehicular power supply apparatus includes: a main power storage device; a power storage device for auxiliary machinery; a charger; and a control device. The main power storage device stores electric power for traveling. The power storage device for auxiliary machinery stores electric power for auxiliary machinery. The charger is configured to receive electric power from an external power supply and charge the main power storage device and the power storage device for auxiliary machinery. The control device controls the charger. The charger includes a capacitor. The capacitor smoothes charging power outputted to the main power storage device. The control device includes: a charging control unit; and a discharging control unit. The charging control unit controls charging of the power storage device for auxiliary machinery by the charger such that the power storage device for auxiliary machinery can receive residual electric charge in the capacitor. The discharging control unit controls the charger, after the end of charging of the main power storage device by the charger, such that the residual electric charge in the capacitor is discharged into the power storage device for auxiliary machinery.

Preferably, the charging control unit controls charging of the power storage device for auxiliary machinery such that remaining capacity of the power storage device for auxiliary machinery does not exceed a prescribed amount. The prescribed amount is determined based on an amount of electric power stored in the capacitor.

Further preferably, the charging control unit stops charging of the power storage device for auxiliary machinery by the charger when the remaining capacity exceeds the prescribed amount, and executes charging of the power storage device for auxiliary machinery by the charger when the remaining capacity is equal to or lower than the prescribed amount.

Preferably, the prescribed amount is an amount obtained by subtracting free capacity of the power storage device for auxiliary machinery required to receive the residual electric charge in the capacitor from full charge capacity of the power storage device for auxiliary machinery.

Preferably, the charger further includes: a main circuit; and a sub power supply unit. The main circuit converts a voltage of electric power supplied from the external power supply and outputs the electric power to the main power storage device. The sub power supply unit converts a voltage of the electric power outputted from the main circuit and outputs the electric power to the power storage device for auxiliary machinery. The charging control unit controls charging of the power storage device for auxiliary machinery by the sub power supply unit such that the power storage device for auxiliary machinery can receive the residual electric charge in the capacitor. The discharging control unit controls the sub power supply unit, after the end of charging of the main power storage device, such that the residual electric charge in the capacitor is discharged into the power storage device for auxiliary machinery.

In addition, preferably, the charger further includes: a main circuit; and a sub power supply unit. The main circuit converts a voltage of electric power supplied from the external power supply and outputs the electric power to the main power storage device. The sub power supply unit is provided on an input side of the main circuit, and converts a voltage of the electric power supplied from the external power supply and outputs the electric power to the power storage device for auxiliary machinery. The main circuit is configured to allow electric power to flow bidirectionally. The charging control unit controls charging of the power storage device for auxiliary machinery by the sub power supply unit such that the power storage device for auxiliary machinery can receive the residual electric charge in the capacitor. The discharging control unit controls the main circuit and the sub power supply unit, after the end of charging of the main power storage device, such that the residual electric charge in the capacitor is discharged into the power storage device for auxiliary machinery.

According to the present invention, a vehicle includes any one of the vehicular power supply apparatus described above.

According to the present invention, a method for controlling a vehicle-mounted charger is directed to a method for controlling a vehicle-mounted charger configured to receive electric power from a power supply external to a vehicle and charge a main power storage device for storing electric power for traveling and a power storage device for auxiliary machinery for storing electric power for auxiliary machinery. The vehicle-mounted charger includes a capacitor. The capacitor smoothes charging power outputted to the main power storage device. The control method includes the steps of: controlling charging of the power storage device for auxiliary machinery by the vehicle-mounted charger such that the power storage device for auxiliary machinery can receive residual electric charge in the capacitor; and controlling the vehicle-mounted charger, after the end of charging of the main power storage device by the vehicle-mounted charger, such that the residual electric charge in the capacitor is discharged into the power storage device for auxiliary machinery.

Preferably, the step of controlling charging of the power storage device for auxiliary machinery includes a step of controlling charging of the power storage device for auxiliary machinery such that remaining capacity of the power storage device for auxiliary machinery does not exceed a prescribed amount. The prescribed amount is determined based on an amount of electric power stored in the capacitor.

Advantageous Effects of Invention

In the present invention, charging of the power storage device for auxiliary machinery by the charger is controlled such that the power storage device for auxiliary machinery can receive the residual electric charge in the capacitor provided in the charger. The charger is controlled such that the residual electric charge in the capacitor is discharged into the power storage device for auxiliary machinery after charging of the main power storage device by the charger ends. Therefore, according to the present invention, the residual electric charge in the capacitor provided in the charger can be reliably discharged without using the discharge resistance.

DESCRIPTION OF EMBODIMENTS

Figure 1:
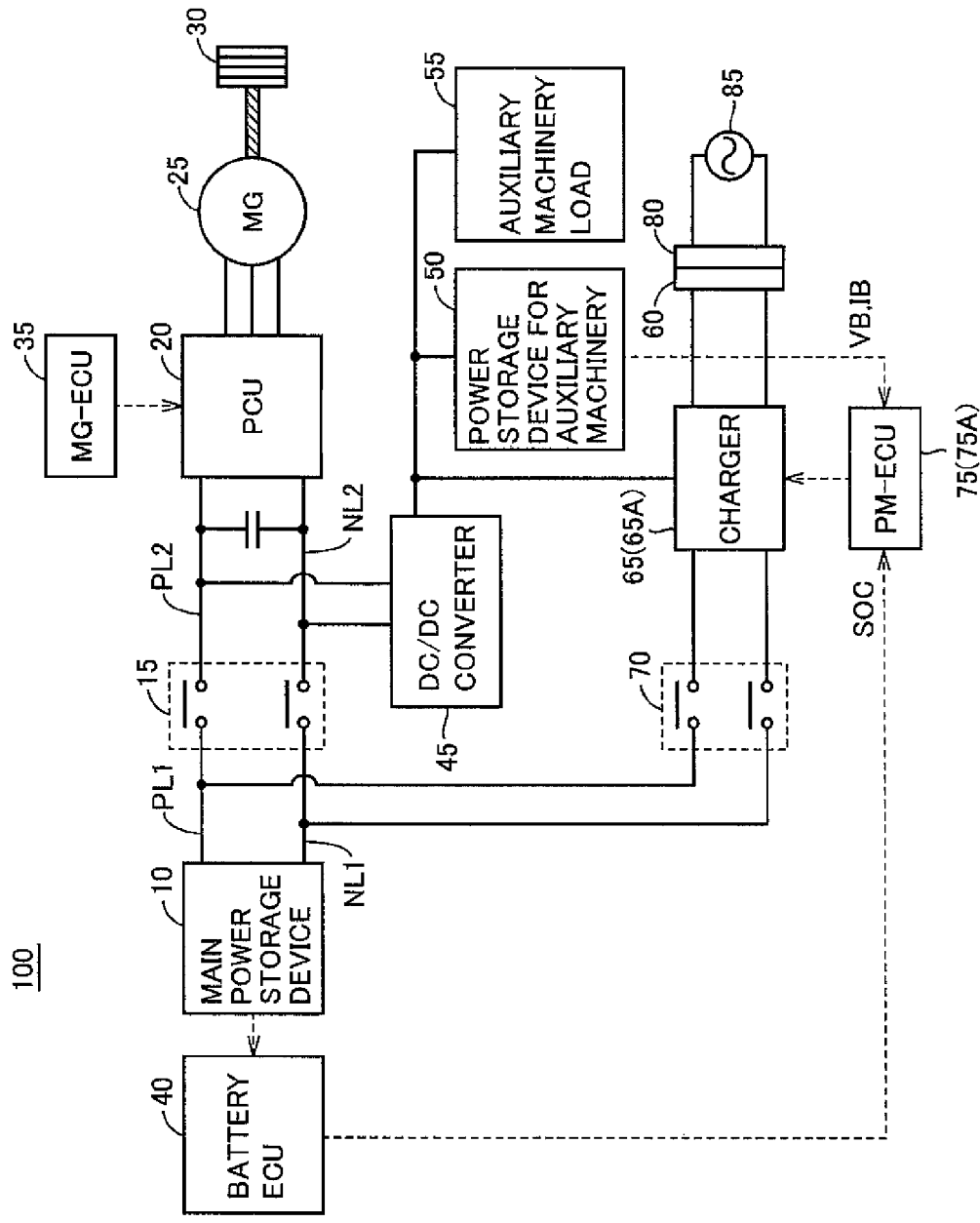
FIG. 1 is an overall block diagram of a vehicle on which a vehicular power supply apparatus according to a first embodiment of the present invention is mounted.

Embodiments of the present invention will be described in detail hereinafter with reference to the drawings, in which the same reference characters are assigned to the same or corresponding portions and description thereof will not be repeated.

[First Embodiment]

FIG. 1 is an overall block diagram of a vehicle on which a vehicular power supply apparatus according to a first embodiment of the present invention is mounted. Referring to FIG. 1, a vehicle 100 includes a main power storage device 10, a system main relay (hereinafter referred to as "SMR (System Main Relay)") 15, a power control unit (hereinafter referred to as "PCU (Power Control Unit)") 20, a motor generator 25, a driving wheel 30, an MG-ECU 35, and a battery ECU 40. Vehicle 100 further includes a DC/DC converter 45, a power storage device 50 for auxiliary machinery, and an auxiliary machinery load 55. Vehicle 100 further includes a charging inlet 60, a charger 65, a charging relay 70, and a PM-ECU 75.

Main power storage device 10 is a DC power supply that stores electric power for traveling, and is formed of a secondary battery such as, for example, a nickel-metal hydride secondary battery and a lithium ion secondary battery. Main power storage device 10 is charged by an external power supply 85 using charger 65 (hereinafter charging of main power storage device 10 by external power supply 85 will also be referred to as "external charging"). In addition, during braking of vehicle 100 or when acceleration decreases on a downward slope, main power storage device 10 receives electric power generated by motor generator 25 from PCU 20 and is charged with the electric power. Then, main power storage device 10 outputs the stored electric power to PCU 20. Instead of the secondary battery, a large-capacitance capacitor can also be used as main power storage device 10.

SMR 15 is provided between main power storage device 10 and PCU 20. SMR 15 is turned on when a vehicle system is activated to cause vehicle 100 to travel, and is turned off when main power storage device 10 is charged by charger 65.

PCU 20 is supplied with the electric power from main power storage device 10 and drives motor generator 25 based on a control signal from MG-ECU 35. During braking of vehicle 100, for example, PCU 20 converts a voltage of the electric power generated by motor generator 25 which receives the kinetic energy from driving wheel 35, and outputs the electric power to main power storage device 10. PCU 20 is formed of, for example, a three-phase PWM inverter including switching elements of three phases. A boosting converter may be provided between the three-phase PWM inverter and main power storage device 10.

Motor generator 25 is a motor generator that is capable of a power running operation and a regenerative operation, and is formed of, for example, a three-phase AC synchronous motor generator having a permanent magnet embedded in a rotor. Motor generator 25 is driven by PCU 20, and generates driving torque for traveling and drives driving wheel 30. During braking of vehicle 100, for example, motor generator 25 receives the kinetic energy of vehicle 100 from driving wheel 30 and generates electric power.

MG-ECU 35 is formed of an electronic control unit (ECU), and controls the operation of PCU 20 through software processing realized by executing prestored programs using a CPU (Central Processing Unit) and/or hardware processing with dedicated electronic circuitry. Specifically, MG-ECU 35 generates a control signal (e.g., a PWM (Pulse Width Modulation) signal) for driving motor generator 25 by PCU 20, and outputs the generated control signal to PCU 20.

Battery ECU 40 is also formed of an ECU, and estimates the remaining capacity of main power storage device 10 (hereinafter also referred to as "SOC (State Of Charge)" and expressed in percentage with respect to the capacity of main power storage device 10) based on detected values of a voltage and an input/output current of main power storage device 10. The voltage and the input/output current of main power storage device 10 are detected by a voltage sensor and a current sensor that are not shown. Various known methods such as a method for calculating the SOC using a relationship between the open circuit voltage (OCV) and the SOC of main power storage device 10 and a method for calculating the SOC using an accumulated value of the input/output current can be used as a method for estimating the SOC. Then, battery ECU 40 outputs the estimated value of the SOC to PM-ECU 75 at the time of external charging.

DC/DC converter 45 is connected to power supply lines PL2 and NL2 arranged between SMR 15 and PCU 20. DC/DC converter 45 converts (steps down) electric power received from power supply lines PL2 and NL2 into an auxiliary machinery voltage and outputs the electric power to power storage device 50 for auxiliary machinery and auxiliary machinery load 55.

Power storage device 50 for auxiliary machinery is a DC power supply that stores electric power for various auxiliary machinery and ECUs, and is formed of, for example, a lead battery and a secondary battery such as a nickel-metal hydride secondary battery and a lithium ion secondary battery. When the vehicle system is in the activated state to cause the vehicle to travel (SMR 15 is in the on state), power storage device 50 for auxiliary machinery is charged by DC/DC converter 45. On the other hand, at the time of external charging (SMR 15 is in the off state and charging relay 70 is in the on state), power storage device 10 for auxiliary machinery is charged by charger 65. Then, power storage device 50 for auxiliary machinery supplies the stored electric power to auxiliary machinery load 55 and each ECU.

Power storage device 50 for auxiliary machinery also includes a voltage sensor for detecting a voltage VB of power storage device 50 for auxiliary machinery, and a current sensor for detecting a current IB inputted/outputted to/from power storage device 50 for auxiliary machinery (the voltage sensor and the current sensor are both not shown), and outputs the detected values of voltage VB and current IB to PM-ECU 75. Auxiliary machinery load 55 collectively means many pieces of auxiliary machinery mounted on vehicle 100.

Charging inlet 60 is configured to be fittable to a connector 80 connected to external power supply 85. Charging inlet 60 receives electric power supplied from external power supply 85, and outputs the electric power to charger 65. A charging plug configured to be connectable to an electrical outlet of external power supply 85 may be provided instead of charging inlet 60.

Charger 65 is configured to receive the electric power from external power supply 85 and charge main power storage device 10 and power storage device 50 for auxiliary machinery. More specifically, at the time of external charging, charger 65 is supplied with the electric power from external power supply 85 and charges main power storage device 10 and power storage device 50 for auxiliary machinery based on a control signal from PM-ECU 75. Charger 65 is provided with a capacitor (not shown in FIG. 1) for smoothing the charging power outputted to main power storage device 10. When external charging ends, residual electric charge in this capacitor is discharged into power storage device 50 for auxiliary machinery. A configuration of charger 65 will be described in detail below.

Charging relay 70 is provided between charger 65 and power supply lines PL1, NL1 arranged between main power storage device 10 and SMR 15. Charging relay 70 is turned on at the time of external charging, and is turned off when external charging ends.

PM-ECU 75 is also formed of an ECU, and controls the operation of charger 65 through software processing realized by executing prestored programs using a CPU and/or hardware processing with dedicated electronic circuitry. Specifically, PM-ECU 75 receives the estimated value of the SOC of main power storage device 10 from battery ECU 40, and receives the detected values of voltage VB and current IB of power storage device 50 for auxiliary machinery from power storage device 50 for auxiliary machinery. At the time of external charging, PM-ECU 75 generates a control signal for charging main power storage device 10 and power storage device 50 for auxiliary machinery by charger 65 based on these values, and outputs the generated control signal to charger 65.

After external charging ends, PM-ECU 75 controls charger 65 such that the residual electric charge in the capacitor provided in charger 65 is discharged into power storage device 50 for auxiliary machinery. In other words, in the first embodiment, PM-ECU 75 controls charger 65 such that the residual electric charge in the capacitor is discharged into power storage device 50 for auxiliary machinery, without providing a discharge resistance for discharging the capacitor.

During external charging, power storage device 50 for auxiliary machinery is also charged by charger 65. PM-ECU 75 controls charging of power storage device 50 for auxiliary machinery by charger 65 such that power storage device 50 for auxiliary machinery can receive the residual electric charge in the capacitor after external charging ends. Specifically, a reference SOC of power storage device 50 for auxiliary machinery is determined based on an amount of electric power stored in the capacitor such that power storage device 50 for auxiliary machinery can receive the residual electric charge in the capacitor after external charging ends. During external charging, PM-ECU 75 controls charging of power storage device 50 for auxiliary machinery by charger 65 such that the SOC of power storage device 50 for auxiliary machinery does not exceed the reference SOC.

Figure 2:
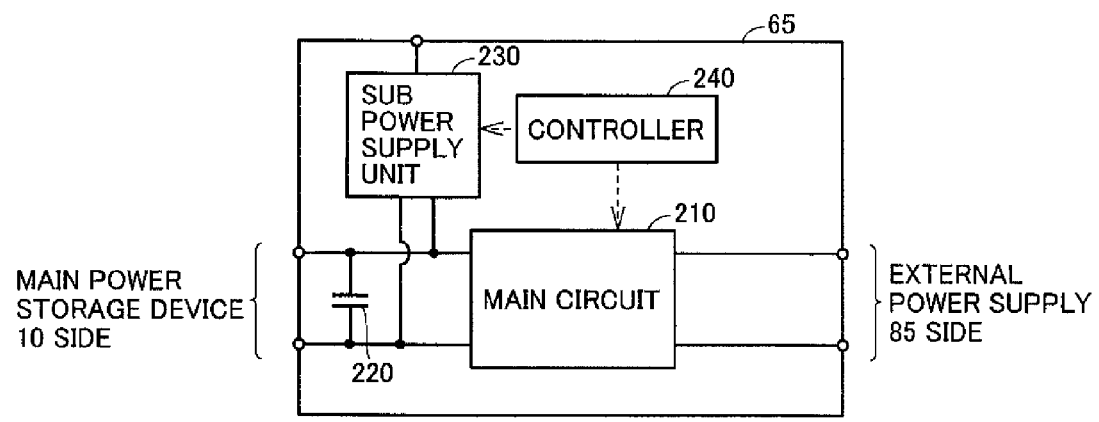
FIG. 2 is a block diagram showing a specific configuration of a charger shown in FIG. 1.

FIG. 2 is a block diagram showing a specific configuration of charger 65 shown in FIG. 1. Referring to FIG. 2, charger 65 includes a main circuit 210, a capacitor 220, a sub power supply unit 230, and a controller 240. Main circuit 210 is driven by controller 240, and converts a voltage of the electric power supplied from external power supply 85 (FIG. 1) into a voltage level of main power storage device 10 (FIG. 1) and outputs the electric power to main power storage device 10.

Capacitor 220 is provided on the output side of main circuit 210 (on the main power storage device 10 side), and specifically, is connected between a pair of power lines on the output side of main circuit 210. Capacitor 220 smoothes the charging power outputted to main power storage device 10.

Sub power supply unit 230 is connected to a pair of power lines on the output side of main circuit 210 (on the main power storage device 10 side). Sub power supply unit 230 is driven by controller 240, and converts a voltage of a part of the electric power outputted from main circuit 210 and outputs the electric power to power storage device 50 for auxiliary machinery (FIG. 1). Sub power supply unit 230 is also driven by controller 240 after external charging ends, and discharges the residual electric charge in capacitor 220 into power storage device 50 for auxiliary machinery. This sub power supply unit 230 is for ensuring electric power for charging control during external charging (electric power for the auxiliary machinery and the ECUs driven at the time of external charging), and has capacity smaller than those of main circuit 210 and DC/DC converter 45 (FIG. 1). Sub power supply unit 230 is formed of a step-down-type DC/DC converter.

Controller 240 controls the operation of main circuit 210 and sub power supply unit 230 through hardware processing with dedicated electronic circuitry and/or software processing realized by executing prestored programs using a CPU. Specifically, controller 240 receives a control signal from PM-ECU 75 and drives main circuit 210 and sub power supply unit 230 based on the received control signal.

Figure 3:
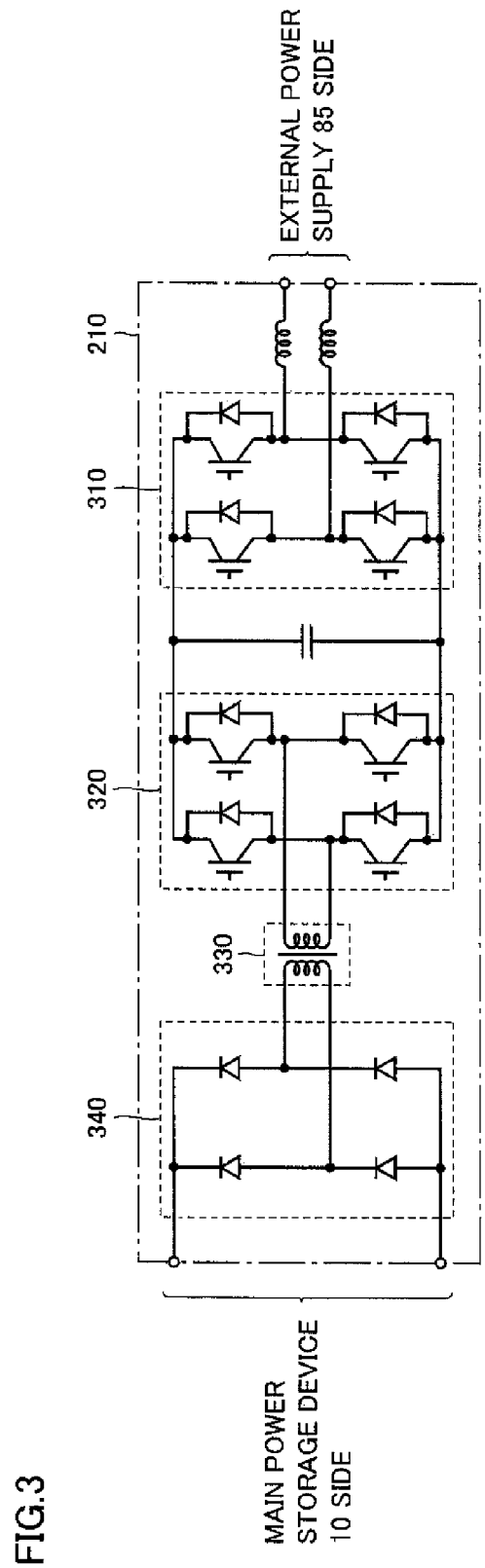
FIG. 3 is a circuit diagram of a main circuit shown in FIG. 2.

FIG. 3 is a circuit diagram of main circuit 210 shown in FIG. 2. Referring to FIG. 3, main circuit 210 includes AC/DC converting units 310 and 320, an insulating transformer 330 and a rectifying unit 340. AC/DC converting units 310 and 320 are each formed of a single-phase bridge circuit. Based on a drive signal from controller 240 (FIG. 2), AC/DC converting unit 310 converts AC power provided from external power supply 85 to charging inlet 60 (FIG. 1) into DC power and outputs the DC power to AC/DC converting unit 320. Based on the drive signal from controller 240, AC/DC converting unit 320 converts the DC power supplied from AC/DC converting unit 310 into high-frequency AC power and outputs the AC power to insulating transformer 330.

Insulating transformer 330 includes a core made of a magnetic material, as well as a primary coil and a secondary coil wound around the core. The primary coil and the secondary coil are electrically insulated, and are connected to AC/DC converting unit 320 and rectifying unit 340, respectively. Insulating transformer 330 converts the high-frequency AC power received from AC/DC converting unit 320 to the voltage level corresponding to the winding ratio of the primary coil and the secondary coil, and outputs the converted power to rectifying unit 340. Rectifying unit 340 rectifies the AC power outputted from insulating transformer 330 to DC power and outputs the DC power to main power storage device 10 (FIG. 1).

Figure 4:
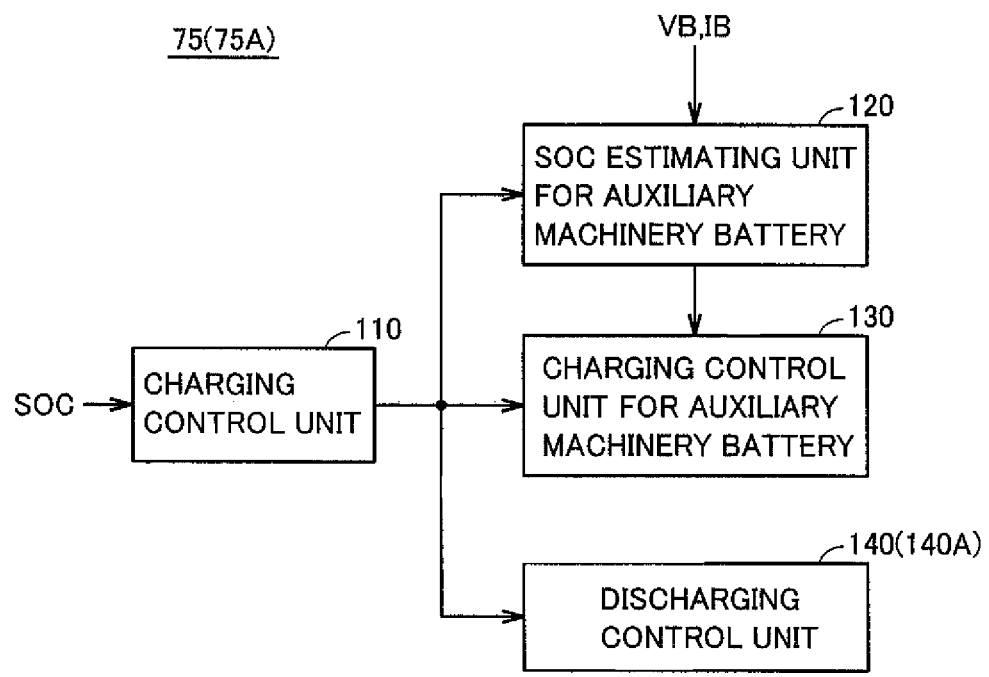
FIG. 4 is a functional block diagram functionally showing a configuration of a PM-ECU shown in FIG. 1.

FIG. 4 is a functional block diagram functionally showing a configuration of PM-ECU 75 shown in FIG. 1. Referring to FIG. 4, PM-ECU 75 includes a charging control unit 110, an SOC estimating unit 120 for estimating the SOC of power storage device 50 for auxiliary machinery (FIG. 1), a charging control unit 130 for controlling charging of power storage device 50 for auxiliary machinery, and a discharging control unit 140.

Charging control unit 110 controls charging of main power storage device 10 by charger 65, based on the estimated value of the SOC of main power storage device 10 received from battery ECU 40 (FIG. 1). Specifically, when receiving a charging start trigger indicating the start of external charging, charging control unit 110 generates a control signal for charging main power storage device 10 by charger 65, and outputs the generated control signal to charger 65 (more specifically, controller 240 (FIG. 2) of charger 65).

During charging of main power storage device 10 by charger 65, charging control unit 110 notifies SOC estimating unit 120, charging control unit 130 and discharging control unit 140 that main power storage device 10 is being charged by charger 65, Furthermore, when the SOC of main power storage device 10 reaches a predetermined upper limit value or when a charging end trigger indicating the end of external charging is received, charging control unit 110 notifies SOC estimating unit 120, charging control unit 130 and discharging control unit 140 that external charging has ended.

During external charging, SOC estimating unit 120 estimates the SOC of power storage device 50 for auxiliary machinery based on the detected values of voltage VB and current IB of power storage device 50 for auxiliary machinery. Similarly to estimation of the SOC of main power storage device 10, various known methods such as a method for calculating the SOC using a relationship between the OCV and the SOC of power storage device 50 for auxiliary machinery and a method for calculating the SOC using an accumulated value of the input/output current of power storage device 50 for auxiliary machinery can be used as a method for estimating the SOC.

During external charging, charging control unit 130 controls charging of power storage device 50 for auxiliary machinery by charger 65, based on the SOC of power storage device 50 for auxiliary machinery estimated by SOC estimating unit 120. Specifically, when receiving the notification that external charging is being performed, charging control unit 130 generates a control signal for driving sub power supply unit 230 (FIG. 2) of charger 65 and outputs the generated control signal to controller 240 of charger 65.

At this time, the reference SOC of power storage device 50 for auxiliary machinery is predetermined based on an amount of electric power stored in capacitor 220 such that power storage device 50 for auxiliary machinery can receive the residual electric charge in capacitor 220 (FIG. 2) of charger 65. As one example, the reference SOC is a value obtained by subtracting free capacity of power storage device 50 for auxiliary machinery required to receive the residual electric charge in capacitor 220 from full charge capacity of power storage device 50 for auxiliary machinery.

During external charging, charging control unit 130 controls charging of power storage device 50 for auxiliary machinery such that the SOC of power storage device 50 for auxiliary machinery does not exceed the reference SOC. Specifically, when the SOC of power storage device 50 for auxiliary machinery exceeds the reference SOC, charging control unit 130 stops generation of the control signal for driving sub power supply unit 230.

When receiving the notification that external charging has ended from charging control unit 110, discharging control unit 140 controls charger 65 such that the residual electric charge in capacitor 220 of charger 65 is discharged into power storage device 50 for auxiliary machinery. Specifically, when external charging ends, discharging control unit 140 generates the control signal for driving sub power supply unit 230 of charger 65 such that the residual electric charge in capacitor 220 is discharged into power storage device 50 for auxiliary machinery, and outputs the generated control signal to controller 240 of charger 65.

Figure 5:
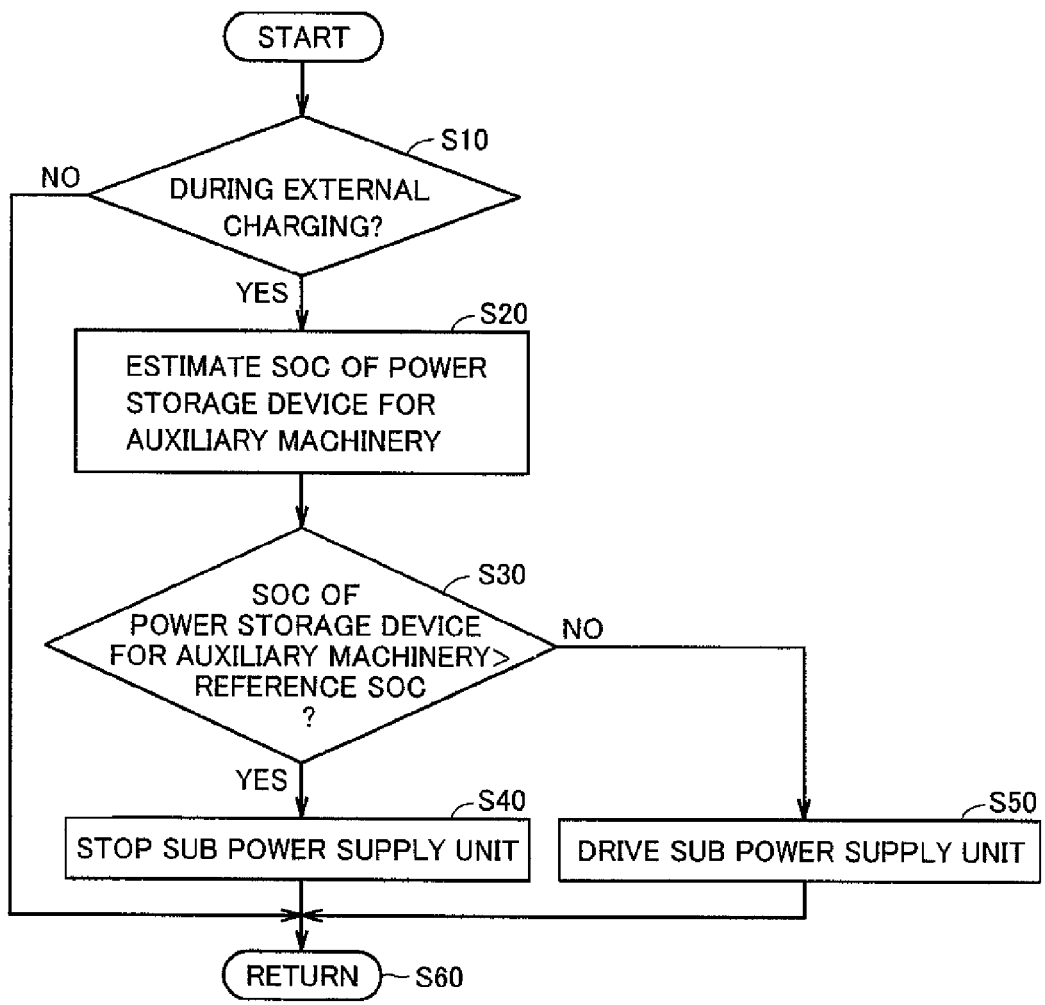
FIG. 5 is a flowchart for describing charging control over a power storage device for auxiliary machinery during external charging.

FIG. 5 is a flowchart for describing charging control over power storage device 50 for auxiliary machinery during external charging. Referring to FIG. 5, PM-ECU 75 determines whether external charging is being performed or not (step S10). If it is determined that external charging is not being performed (NO in step S10), PM-ECU 75 proceeds to step S60 without executing the rest of the process.

If it is determined in step S10 that external charging is being performed (YES in step S10), PM-ECU 75 estimates the SOC of power storage device 50 for auxiliary machinery based on the detected values of voltage VB and current IB of power storage device 50 for auxiliary machinery (step S20). Then, PM-ECU 75 determines whether the SOC of power storage device 50 for auxiliary machinery is higher than the reference SOC or not (step S30). The reference SOC is determined based on the amount of electric power stored in capacitor 220 as described above.

If it is determined in step S30 that the SOC of power storage device 50 for auxiliary machinery is higher than the reference SOC (YES in step S30), PM-ECU 75 stops generation of the control signal for driving sub power supply unit 230 (FIG. 2) of charger 65. As a result, sub power supply unit 230 stops (step S40).

On the other hand, if it is determined in step S30 that the SOC of power storage device 50 for auxiliary machinery is equal to or lower than the reference SOC (NO in step S30), PM-ECU 75 generates the control signal for driving sub power supply unit 230 of charger 65 and outputs the generated control signal to controller 240 (FIG. 2) of charger 65. As a result, sub power supply unit 230 is driven (step S50).

Figure 6:
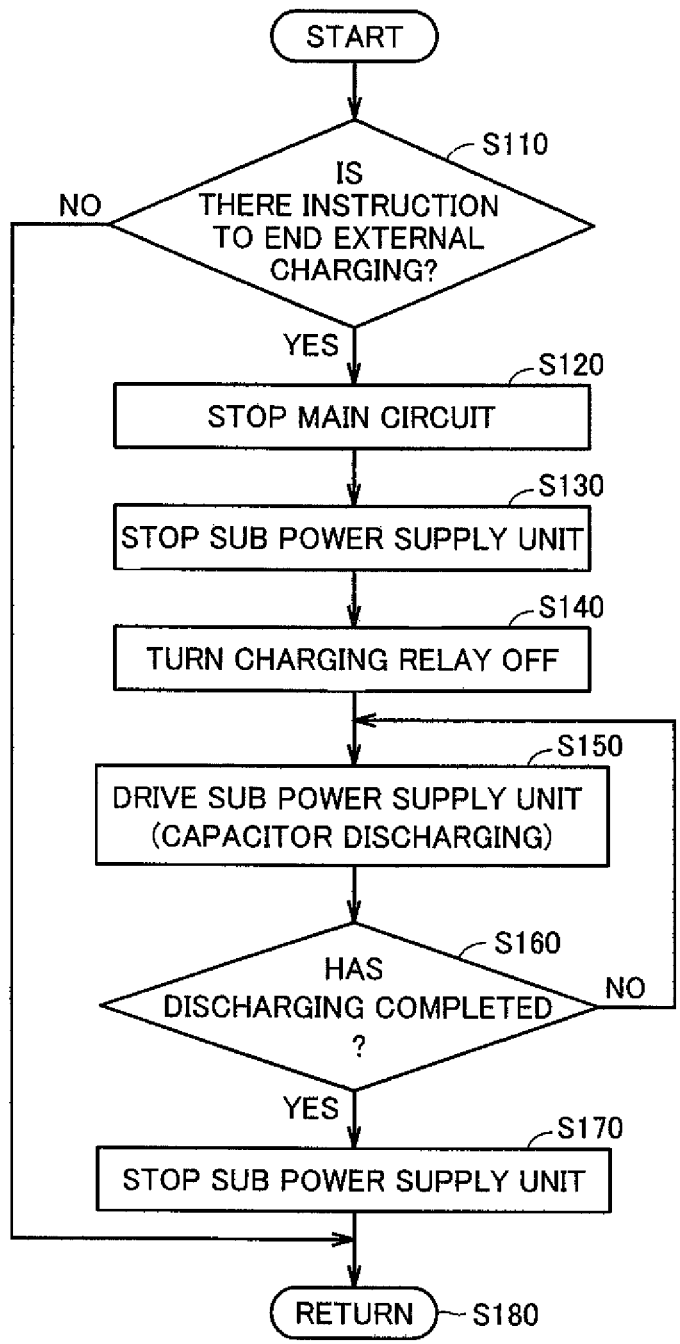
FIG. 6 is a flowchart for describing discharging control over a capacitor executed after external charging ends.

FIG. 6 is a flowchart for describing discharging control over capacitor 220 executed after external charging ends. Referring to FIG. 6, PM-ECU 75 determines whether there is an instruction to end external charging or not (step S110). For example, when the SOC of main power storage device 10 reaches the upper limit value or when the charging end trigger is received, it is determined that there is an instruction to end external charging. If it is determined that external charging has not yet ended (NO in step S110), PM-ECU 75 proceeds to step S180 without executing the rest of the process.

If it is determined in step S110 that there is an instruction to end external charging (YES in step S110), PM-ECU 75 stops generation of the control signal for driving main circuit 210 (FIG. 2) of charger 65. As a result, main circuit 210 stops (step S120). PM-ECU 75 also stops generation of the control signal for driving sub power supply unit 230 (FIG. 2) of charger 65. As a result, sub power supply unit 230 stops (step S130). Furthermore, PM-ECU 75 turns charging relay 70 (FIG. 1) off (step S140). As a result, charger 65 is electrically disconnected from main power storage device 10.

When charging relay 70 is turned off, PM-ECU 75 generates the control signal for driving sub power supply unit 230 of charger 65. As a result, sub power supply unit 230 is driven again and discharging from capacitor 220 into power storage device 50 for auxiliary machinery by sub power supply unit 230 starts (step S150).

When sub power supply unit 230 is driven, PM-ECU 75 determines whether discharging of capacitor 220 has completed or not (step S160). Whether discharging of capacitor 220 has completed or not is determined based on, for example, a value detected by a not-shown voltage sensor that is capable of detecting a voltage of capacitor 220. If it is determined in step S160 that discharging has not yet completed (NO in step S160), PM-ECU 75 returns to step S150.

If it is determined in step S160 that discharging of capacitor 220 has completed (YES in step S160), PM-ECU 75 stops generation of the control signal for driving sub power supply unit 230. As a result, sub power supply unit 230 stops finally (step S170).

As described above, in the first embodiment, charger 65 is configured to be capable of charging main power storage device 10 and power storage device 50 for auxiliary machinery by external power supply 85. During external charging, PM-ECU 75 controls charging of power storage device 50 for auxiliary machinery by sub power supply unit 230 of charger 65 such that the SOC of power storage device 50 for auxiliary machinery does not exceed the reference SOC. In other words, PM-ECU 75 controls charging of power storage device 50 for auxiliary machinery during external charging such that power storage device 50 for auxiliary machinery can receive the residual electric charge in capacitor 220 of charger 65 after external charging ends. After external charging ends, PM-ECU 75 controls charger 65 such that the residual electric charge in capacitor 220 is discharged into power storage device 50 for auxiliary machinery. Therefore, according to the first embodiment, the residual electric charge in capacitor 220 provided in charger 65 can be reliably discharged without using the discharge resistance.

[Second Embodiment]

In the above-described first embodiment, sub power supply unit 230 is connected to the pair of power lines on the output side of main circuit 210 (on the main power storage device 10 side). The sub power supply unit may, however, be provided on the input side of the main circuit (on the external power supply 85 side).

An overall configuration of a vehicle according to this second embodiment is the same as that of vehicle 100 according to the first embodiment shown in FIG. 1.

Figure 7:
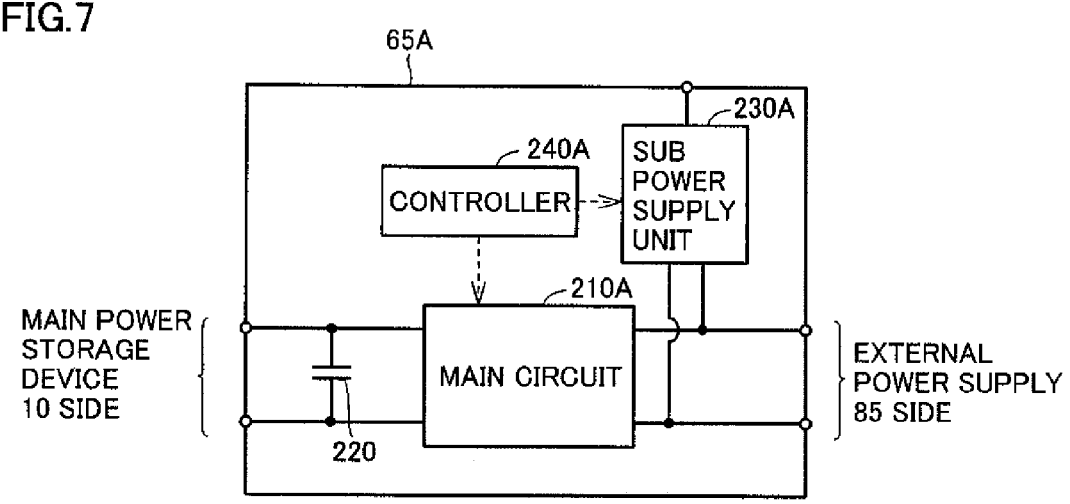
FIG. 7 is a block diagram showing a configuration of a charger in a second embodiment.

FIG. 7 is a block diagram showing a configuration of a charger 65A in the second embodiment. Referring to FIG. 7, charger 65A includes a main circuit 210A, capacitor 220, a sub power supply unit 230A, and a controller 240A.

Main circuit 210A is driven by controller 240A, and converts a voltage of the electric power supplied from external power supply 85 (FIG. 1) into a voltage level of main power storage device 10 (FIG. 1) and outputs the electric power to main power storage device 10. Main circuit 210A is also driven by controller 240A after external charging ends, and discharges the residual electric charge in capacitor 220 into sub power supply unit 230A. In other words, main circuit 210A is configured to allow electric power to flow bidirectionally. A configuration of main circuit 210A will be described below.

Sub power supply unit 230A is connected to a pair of power lines on the input side of main circuit 210A (on the external power supply 85 side). Sub power supply unit 230A is driven by controller 240A, and converts a voltage of a part of the electric power supplied from external power supply 85 and outputs the electric power to power storage device 50 for auxiliary machinery. Sub power supply unit 230A is also driven by controller 240A after external charging ends, and discharges the residual electric charge in capacitor 220 received from main circuit 210 into power storage device 50 for auxiliary machinery. Sub power supply unit 230A is formed of an AC/DC converter that can also make DC/DC conversion.

Controller 240A controls the operation of main circuit 210A and sub power supply unit 230A through hardware processing with dedicated electronic circuitry and/or software processing realized by executing prestored programs using a CPU. Specifically, controller 240A receives a control signal from a PM-ECU 75A (FIG. 1) and drives main circuit 210A and sub power supply unit 230A based on the received control signal.

In the second embodiment, sub power supply unit 230A is provided on the input side of main circuit 210A. At the time of external charging, sub power supply unit 230A converts a voltage of a part of the electric power supplied from external power supply 85 and charges power storage device 50 for auxiliary machinery. When external charging ends, main circuit 210A and sub power supply unit 230A are driven and the residual electric charge in capacitor 220 is discharged through main circuit 210 and sub power supply unit 230A into power storage device 50 for auxiliary machinery.

Figure 8:
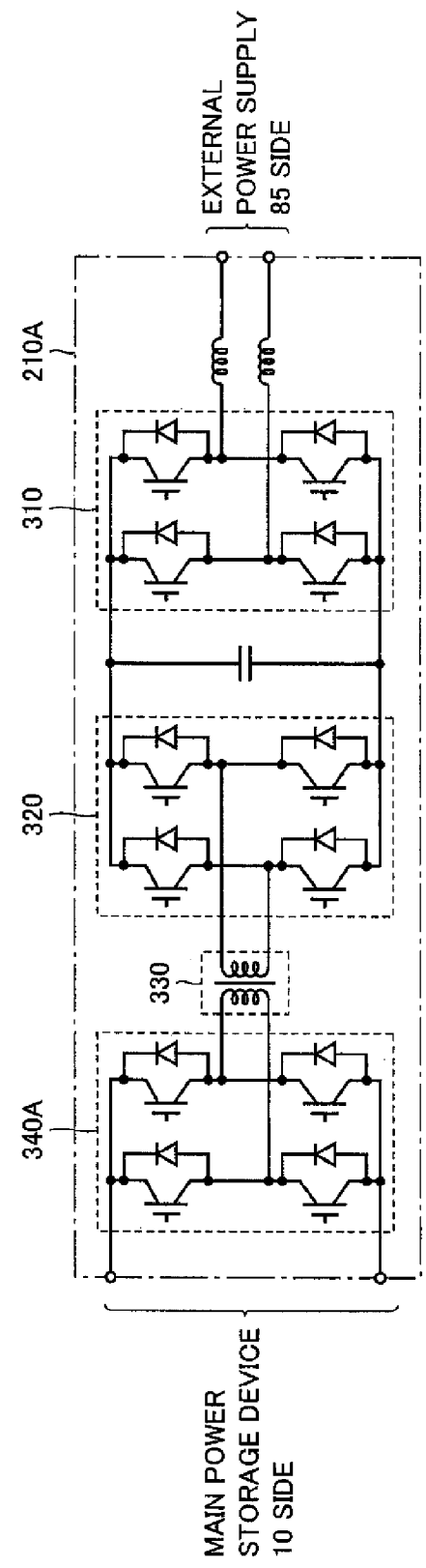
FIG. 8 is a circuit diagram of a main circuit shown in FIG. 7.

FIG. 8 is a circuit diagram of main circuit 210A shown in FIG. 7. Referring to FIG. 8, this main circuit 210A differs from main circuit 210 in the first embodiment shown in FIG. 3 in that an AC/DC converting unit 340A is included instead of rectifying unit 340.

AC/DC converting unit 340A is formed of a single-phase bridge circuit. Based on a drive signal from controller 240A (FIG. 7), AC/DC converting unit 340A converts AC power outputted from insulating transformer 330 into DC power and outputs the DC power to main power storage device 10 (FIG. 1).

Each of AC/DC converting units 310, 320 and 340A and insulating transformer 330 can make bidirectional power conversion. In the second embodiment, when external charging ends, each of AC/DC converting units 340A, 322 and 310 operates to allow electric power to flow from the main power storage device 10 side to the external power supply 85 side, based on the drive signal from controller 240A. As a result, after external charging ends, the residual electric charge in capacitor 220 (FIG. 7) provided on the main power storage device 10 side is outputted through main circuit 210A to sub power supply unit 230A (FIG. 7) and is discharged into power storage device 50 for auxiliary machinery by sub power supply unit 230A.

Referring again to FIG. 4, PM-ECU 75A in the second embodiment differs from PM-ECU 75 in the first embodiment in that a discharging control unit 140A is included instead of control unit 140. When receiving the notification that external charging has ended from charging control unit 110, discharging control unit 140A controls charger 65A such that the residual electric charge in capacitor 220 of charger 65A is discharged into power storage device 50 for auxiliary machinery. Specifically, when external charging ends, discharging control unit 140A generates a control signal for driving main circuit 210A and sub power supply unit 230A of charger 65A such that the residual electric charge in capacitor 220 is discharged into power storage device 50 for auxiliary machinery, and outputs the generated control signal to controller 240A of charger 65A.

Figure 9:
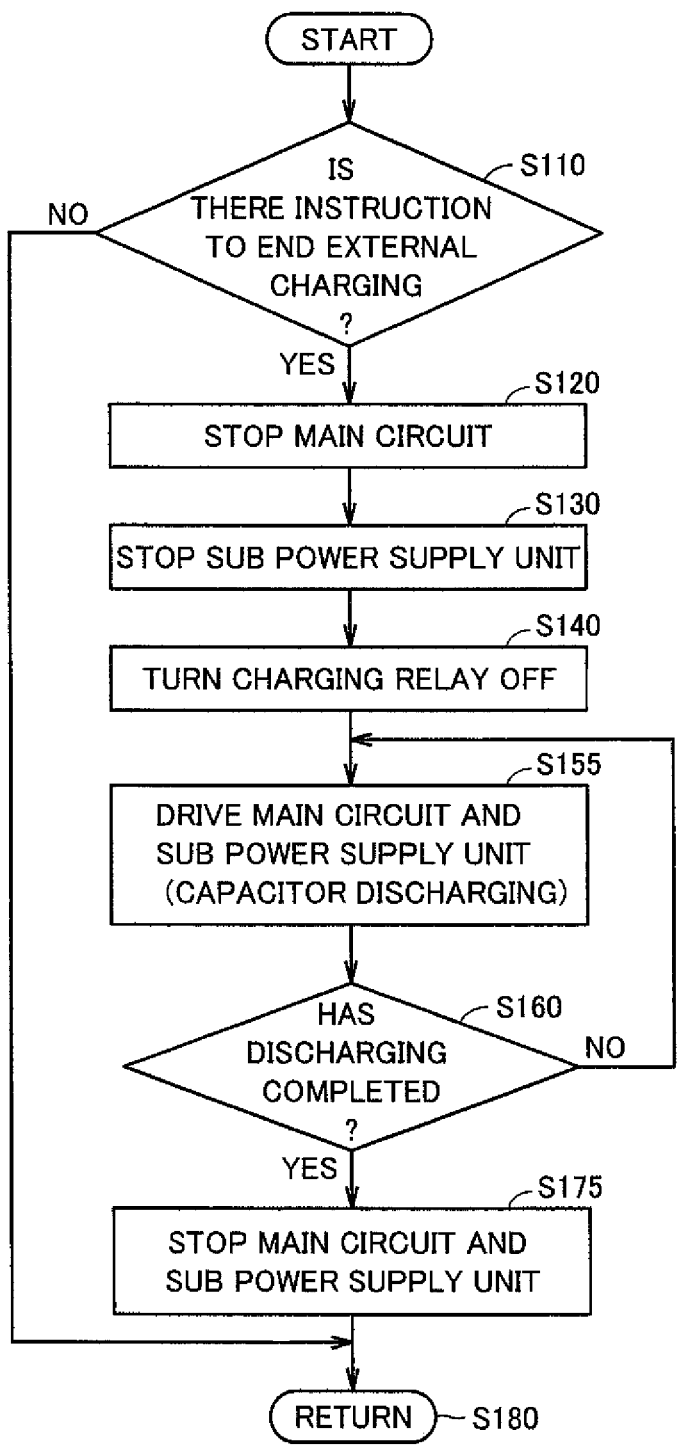
FIG. 9 is a flowchart for describing discharging control over a capacitor in the second embodiment.

FIG. 9 is a flowchart for describing discharging control over capacitor 220 in the second embodiment. Referring to FIG. 9, this flowchart differs from the flowchart of FIG. 6 showing discharging control over capacitor 220 in the first embodiment in that steps S155 and S175 are included instead of steps S150 and S170, respectively.

In other words, when charging relay 70 (FIG. 1) is turned off in step S140, PM-ECU 75A generates the control signal for driving main circuit 210A and sub power supply unit 230A of charger 65. As a result, main circuit 210A and sub power supply unit 230A are driven again, and discharging from capacitor 220 into power storage device 50 for auxiliary machinery through main circuit 210A and sub power supply unit 230A starts (step S155).

If it is determined in step S160 that discharging of capacitor 220 has completed (YES in step S160), PM-ECU 75A stops generation of the control signal for driving main circuit 210A and sub power supply unit 230A. As a result, main circuit 210A and sub power supply unit 230A stop finally (step S175).

As described above, in the second embodiment, sub power supply unit 230A is provided on the input side of main circuit 210A of charger 65A (on the external power supply 85 side). Main circuit 210A is configured to allow electric power to flow bidirectionally, and when external charging ends, the residual electric charge in capacitor 220 is discharged into power storage device 50 for auxiliary machinery by main circuit 210A and sub power supply unit 230A. During external charging, charging of power storage device 50 for auxiliary machinery by sub power supply unit 230A is controlled such that the SOC of power storage device 50 for auxiliary machinery does not exceed the reference SOC. Therefore, according to the second embodiment as well, the residual electric charge in capacitor 220 provided in charger 65A can be reliably discharged without using the discharge resistance.

In each embodiment described above, vehicle 100 has been described as an electric-powered vehicle in which motor generator 25 serves as a motive power source. Vehicle 100 may, however, be an electric vehicle in which only motor generator 25 serves as a motive power source, or a hybrid vehicle having an engine (not shown) further mounted thereon in addition to motor generator 25.

In the foregoing, PM-ECU 75, 75A corresponds to one example of "control device" in the present invention, and charging control unit 130 for controlling charging of power storage device 50 for auxiliary machinery corresponds to one example of "charging control unit" in the present invention.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

Reference Signs List 10 main power storage device; 15 SMR; 20 PCU; 25 motor generator; 30 driving wheel; 35 MG-ECU; 40 battery ECU; 45 DC/DC converter; 50 power storage device for auxiliary machinery; 55 auxiliary machinery load; 60 charging inlet; 65, 65A charger; 70 charging relay; 75, 75A PM-ECU; 80 connector; 85 external power supply; 100 vehicle; 110, 130 charging control unit; 120 SOC estimating unit; 140, 140A discharging control unit; 210, 210A main circuit; 220 capacitor; 230, 230A sub power supply unit; 240, 240A controller; 310, 320, 340A AC/DC converting unit; 330 insulating transformer; 340 rectifying unit; PL1, PL2, NL1, NL2 power supply line

The invention claimed is:

1. A vehicular power supply apparatus, comprising:
a main power storage device for storing electric power for traveling;
a power storage device for auxiliary machinery for storing electric power for auxiliary machinery;
a charger configured to receive electric power from a power supply external to a vehicle and charge said main power storage device and said power storage device for auxiliary machinery; and
a control device for controlling said charger, wherein
said charger includes a capacitor for smoothing charging power outputted to said main power storage device,
said control device includes:

a charging control unit for controlling charging of said power storage device for auxiliary machinery by said charger such that said power storage device for auxiliary machinery can receive residual electric charge in said capacitor; and a discharging control unit for controlling said charger, after the end of charging of said main power storage device by said charger, such that the residual electric charge in said capacitor is discharged into said power storage device for auxiliary machinery, said charging control unit controls charging of said power storage device for auxiliary machinery such that remaining capacity of said power storage device for auxiliary machinery does not exceed a prescribed amount, said prescribed amount is determined based on an amount of electric power stored in said capacitor, said charger further includes:

a main circuit for converting a voltage of electric power supplied from said power supply and outputting the electric power to said main power storage device; and a sub power supply unit for converting a voltage of the electric power outputted from said main circuit and outputting the electric power to said power storage device for auxiliary machinery, said charging control unit controls charging of said power storage device for auxiliary machinery by said sub power supply unit such that said power storage device for auxiliary machinery can receive the residual electric charge in said capacitor, and said discharging control unit controls said sub power supply unit, after the end of charging of said main power storage device, such that the residual electric charge in said capacitor is discharged into said power storage device for auxiliary machinery.

2. The vehicular power supply apparatus according to claim 1, wherein said charging control unit stops charging of said power storage device for auxiliary machinery by said charger when said remaining capacity exceeds said prescribed amount, and executes charging of said power storage device for auxiliary machinery by said charger when said remaining capacity is equal to or lower than said prescribed amount.

3. The vehicular power supply apparatus according to claim 1, wherein said prescribed amount is an amount obtained by subtracting free capacity of said power storage device for auxiliary machinery required to receive the residual electric charge in said capacitor from full charge capacity of said power storage device for auxiliary machinery.

4. A vehicle, comprising the vehicular power supply apparatus as recited in claim 1.

5. A vehicular power supply apparatus, comprising:

a main power storage device for storing electric power for traveling;

a power storage device for auxiliary machinery for storing electric power for auxiliary machinery;

a charger configured to receive electric power from a power supply external to a vehicle and charge said main power storage device and said power storage device for auxiliary machinery; and a control device for controlling said charger, wherein said charger includes a capacitor for smoothing charging power outputted to said main power storage device, said control device includes:

a charging control unit for controlling charging of said power storage device for auxiliary machinery by said charger such that said power storage device for auxiliary machinery can receive residual electric charge in said capacitor; and a discharging control unit for controlling said charger, after the end of charging of said main power storage device by said charger, such that the residual electric charge in said capacitor is discharged into said power storage device for auxiliary machinery, said charging control unit controls charging of said power storage device for auxiliary machinery such that remaining capacity of said power storage device for auxiliary machinery does not exceed a prescribed amount, said prescribed amount is determined based on an amount of electric power stored in said capacitor, said charger further includes:

a main circuit for converting a voltage of electric power supplied from said power supply and outputting the electric power to said main power storage device; and a sub power supply unit provided on an input side of said main circuit, for converting a voltage of the electric power supplied from said power supply and outputting the electric power to said power storage device for auxiliary machinery, said main circuit is configured to allow electric power to flow bidirectionally, said charging control unit controls charging of said power storage device for auxiliary machinery by said sub power supply unit such that said power storage device for auxiliary machinery can receive the residual electric charge in said capacitor, and said discharging control unit controls said main circuit and said sub power supply unit, after the end of charging of said main power storage device, such that the residual electric charge in said capacitor is discharged into said power storage device for auxiliary machinery.

6. The vehicular power supply apparatus according to claim 5, wherein said charging control unit stops charging of said power storage device for auxiliary machinery by said charger when said remaining capacity exceeds said prescribed amount, and executes charging of said power storage device for auxiliary machinery by said charger when said remaining capacity is equal to or lower than said prescribed amount.

7. The vehicular power supply apparatus according to claim 5, wherein said prescribed amount is an amount obtained by subtracting free capacity of said power storage device for auxiliary machinery required to receive the residual electric charge in said capacitor from full charge capacity of said power storage device for auxiliary machinery.

8. A vehicle, comprising the vehicular power supply apparatus as recited in claim 5.

9. A method for controlling a vehicle-mounted charger configured to receive electric power from a powers supply external to a vehicle and charge a main power storage device for storing electric power for traveling and a power storage device for auxiliary machinery for storing electric power for auxiliary machinery, said vehicle-mounted charger including a capacitor for smoothing charging power outputted to said main power storage device, the method comprising the steps of:

controlling charging of said power storage device for auxiliary machinery by said vehicle-mounted charger such that said power storage device for auxiliary machinery can receive residual electric charge in said capacitor; and controlling said vehicle-mounted charger, after the end of charging of said main power storage device by said vehicle-mounted charger, such that the residual electric charge in said capacitor is discharged into said power storage device for auxiliary machinery, the step of controlling charging of said power storage device for auxiliary machinery includes a step of controlling charging of said power storage device for auxiliary machinery such that remaining capacity of said power storage device for auxiliary machinery does not exceed a prescribed amount, said prescribed amount is determined based on an amount of electric power stored in said capacitor, said vehicle-mounted charger further includes:

a main circuit for converting a voltage of electric power supplied from said power supply and outputting the electric power to said main power storage device; and a sub power supply unit for converting a voltage of the electric power outputted from said main circuit and outputting the electric power to said power storage device for auxiliary machinery, the step of controlling charging of said power storage device for auxiliary machinery includes a step of controlling charging of said power storage device for auxiliary machinery by said sub power supply unit such that said power storage device for auxiliary machinery can receive the residual electric charge in said capacitor, and the step of controlling said vehicle-mounted charger includes a step of controlling said sub power supply unit, after the end of charging of said main power storage device, such that the residual electric charge in said capacitor is discharged into said power storage device for auxiliary machinery.

10. A method for controlling a vehicle-mounted charger configured to receive electric power from a power supply external to a vehicle and charge a main power storage device for storing electric power for traveling and a power storage device for auxiliary machinery for storing electric power for auxiliary machinery, said vehicle-mounted charger including a capacitor for smoothing charging power outputted to said main power storage device, the method comprising the steps of:

controlling charging of said power storage device for auxiliary machinery by said vehicle-mounted charger such that said power storage device for auxiliary machinery can receive residual electric charge in said capacitor; and controlling said vehicle-mounted charger, after the end of charging of said main power storage device by said vehicle-mounted charger, such that the residual electric charge in said capacitor is discharged into said power storage device for auxiliary machinery, the step of controlling charging of said power storage device for auxiliary machinery includes a step of controlling charging of said power storage device for auxiliary machinery such that remaining capacity of said power storage device for auxiliary machinery does not exceed a prescribed amount, said prescribed amount is determined based on an amount of electric power stored in said capacitor, said vehicle-mounted charger further includes:

a main circuit for converting a voltage of electric power supplied from said power supply and outputting the electric power to said main power storage device; and a sub power supply unit provided on an input side of said main circuit, for converting a voltage of the electric power supplied from said power supply and outputting the electric power to said power storage device for auxiliary machinery, said main circuit is configured to allow electric power to flow bidirectionally, the step of controlling charging of said power storage device for auxiliary machinery includes a step of controlling charging of said power storage device for auxiliary machinery by said sub power supply unit such that said power storage device for auxiliary machinery can receive the residual electric charge in said capacitor, and the step of controlling said vehicle-mounted charger includes a step of controlling said main circuit and said sub power supply unit, after the end of charging of said main power storage device, such that the residual electric charge in said capacitor is discharged into said power storage device for auxiliary machinery.

* * * * *